(12) United States Patent
Peiker

(10) Patent No.: US 7,277,539 B2
(45) Date of Patent: Oct. 2, 2007

(54) DEVICE FOR HOLDING AND CONTACTING A RADIO TELEPHONE

(76) Inventor: Andreas Peiker, Max-Planck-Strasse 32, 61381 Friedrichsdorf (DE)

( * ) Notice: Subject to any disclaimer, the term of this patent is extended or adjusted under 35 U.S.C. 154(b) by 1097 days.

(21) Appl. No.: 09/914,385

(22) PCT Filed: Nov. 29, 2000

(86) PCT No.: PCT/DE00/04253

§ 371 (c)(1),
(2), (4) Date: Aug. 28, 2001

(87) PCT Pub. No.: WO01/51315

PCT Pub. Date: Jul. 19, 2001

(65) Prior Publication Data

US 2004/0077371 A1    Apr. 22, 2004

(30) Foreign Application Priority Data

Jan. 12, 2000   (DE) ............................... 100 01 011

(51) Int. Cl.
*H04M 1/00*   (2006.01)
(52) U.S. Cl. .................. 379/446; 379/455; 379/454
(58) Field of Classification Search .............. 379/446, 379/455, 454
See application file for complete search history.

(56) References Cited

U.S. PATENT DOCUMENTS 4,640,542 A * 2/1987 Watjer et al. ............... 296/37.8

5,787,167 A * 7/1998 Anderson ................... 379/446
6,208,734 B1 * 3/2001 Ortscheid et al. ........... 379/446
6,215,870 B1 * 4/2001 Hirai et al. ................. 379/446

FOREIGN PATENT DOCUMENTS

| DE | 41 07 996  | 9/1992 |
| DE | 298 21 166 | 4/1999 |
| DE | 197 55 621 | 6/1999 |
| GB | 2 261 571  | 5/1993 |

OTHER PUBLICATIONS

Iwabuchi Hiroshi, "On-Vehicle Holder of Portable Radiotelephone Equipment", Patent Abstracts of Japan No. 05 294190, vol. 018, No. 083, (M-1558), Feb. 10, 1994.
Sakai Yoshito, "Telephone Set Holder", Patent Abstracts of Japan No. 11 220520, vol. 30, No. 13, Nov. 30, 1999.

* cited by examiner

*Primary Examiner*—Ahmad F. Matar
*Assistant Examiner*—Karen Le
(74) *Attorney, Agent, or Firm*—Venable LLP; Robert Kinberg; Ryan M. Flandro

(57) ABSTRACT

The invention relates to an apparatus for holding and making contact with a radio telephone, having an elongate, cuboidal housing with a contact unit which is located at one housing end and has contact-making and/or connecting elements, the contact unit of the radio telephone interacting with a pivotable mating contact unit (29) of a holder (20) for the radio telephone, and it being possible for the radio telephone to be positioned and/or plugged, by way of its contact unit, on the mating contact unit (29) of the holder (20) and to be pivoted therewith through a pivot angle. Provision is made here for the holder (20) to be adapted, in particular, to the longitudinal dimension of the housing of the radio telephone.

13 Claims, 4 Drawing Sheets

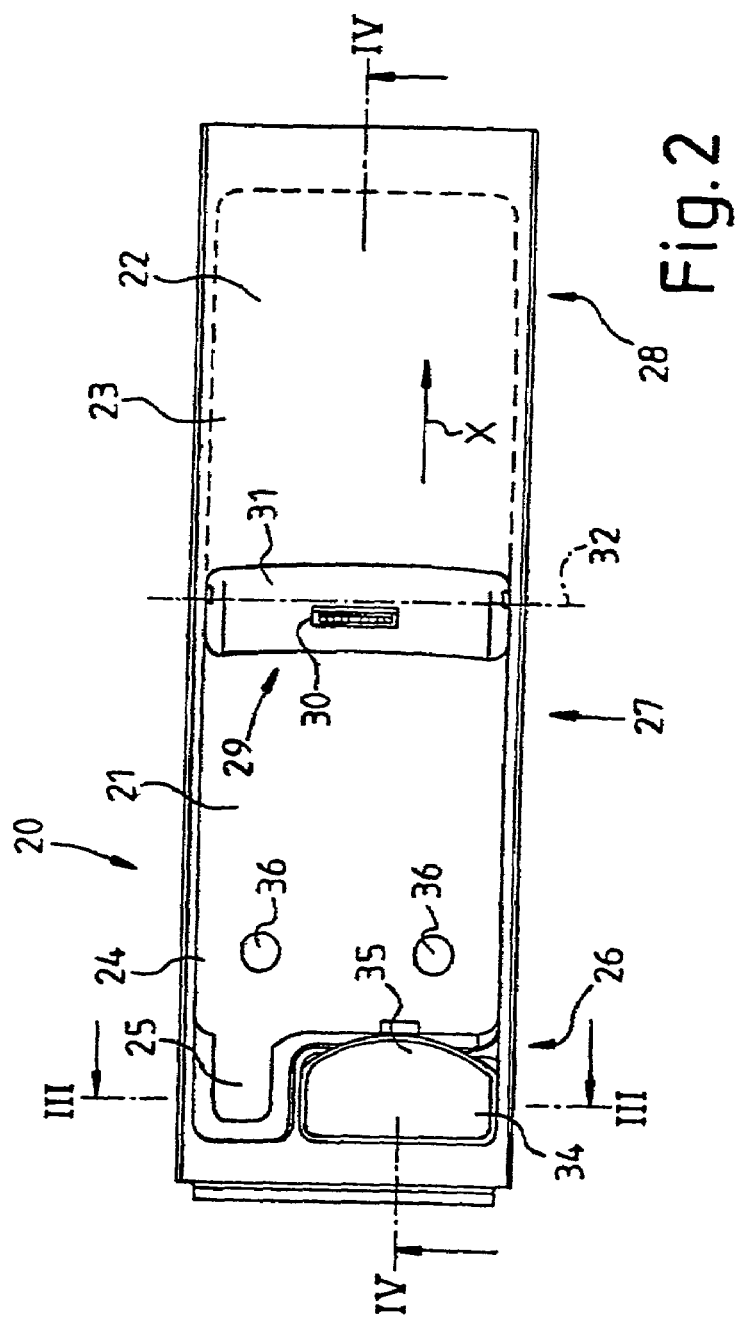
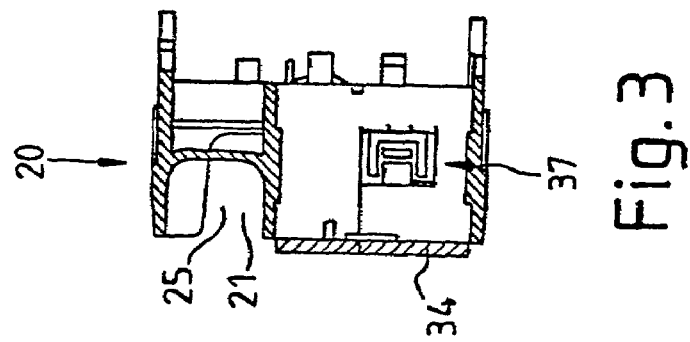

DEVICE FOR HOLDING AND CONTACTING A RADIO TELEPHONE

The invention relates to an apparatus according to the preamble of patent claim 1.

Such apparatuses are used in order for a radio telephone to be retained securely and to be connected electrically to components installed in the vehicle, for examples hands-free talking facilities, displays and vehicle aerials.

Such an accommodating apparatus is known, for example, from DE 197 55 621 A1. In this retaining apparatus, a mobile is plugged on plug contacts which, on a plate, are articulated on a slide via a hinge. In order to accommodate the mobile in a compartment, the mobile is pivoted onto the slide, clamped in this position by a wall element and then moved into the compartment in the longitudinal direction of the slide. For removal of the mobile, the plate is pivoted with the mobile and the mobile is drawn off from the plug contacts.

The disadvantage with the prior art is that, when the mobile is plugged on and/or drawn off, the plug contacts of the retaining apparatus can only exert a limited counterpressure since forces can only be dissipated to the compartment via the plate, hinge and slide. Furthermore, it is not possible for mobiles of different sizes to be retained securely by the retaining apparatus, since the retaining apparatus, which retains the mobile in a force-fitting manner, is coordinated with a predetermined size of mobile.

The object of the invention is to provide an apparatus which allows the insertion of radio telephones of a wide range of different dimensions, does not yield as the radio telephone is placed in position and removed, and, for the purposes of placing in position and removal, moves the radio telephone into an ergonomically optimal position for the user.

This object is achieved according to the invention, in conjunction with the preamble of patent claim 1, by the characterizing features of patent claim 1.

The apparatus according to the invention comprises a holder which can be adapted to the longitudinal dimension of the housing of the radio telephone. This adaptation takes place by a longitudinal displacement of the mating contact unit to which the radio telephone is connected. Alternatively, or in addition, length adaptation is provided by a longitudinal slide mounted on the holder independently of the mating contact unit. These possibilities for adaptation realize a holder for radio telephones which makes it possible to accommodate radio telephones of different length dimensions without the holder having to be modified in any way by the exchange of components or by additional components. As far as the use of the holder in motor vehicles is concerned, this means that the holder provided can be used by any user who has a radio telephone which has a certain contact unit. It is unimportant here whether the various radio telephones have the same dimensions, in particular longitudinal dimensions.

The insertion of radio telephones of different housing widths and/or housing thicknesses is ensured in that the mating contact unit, in the region of the contact means, has elevations only in a region which is located outside the conventional radio-telephone dimensions. This forms a holder with an accommodating table or accommodating region which is fully independent of the housing dimensions. All that is thus required is for the radio telephone which is to be inserted to have an appropriate contact unit. The use of a subsequently purchased thick storage battery which renders the radio telephone thicker on the rear side thus does not necessitate any adaptation of the holder.

An ergonomic accommodating position/discharge position with the radio telephone is achieved in that, in this position, the mating contact unit has been pivoted through 45° to 135° in relation to the main plane of the holder. It is thus possible for the radio telephone to be coupled to the holder by a straightforward positioning movement in which the user, with the hand position remaining the same, merely has to lower his/her forearm.

Moving the radio telephone from the accommodating position/discharge position into an operating position also takes place with a flowing hand movement. In this case, the radio telephone is tilted in the direction of the holder and moved into the holder by a tilting/sliding movement. The rearward sliding movement which is necessary at the end, by means of which the radio telephone is moved beneath a restraining element by way of a head end, does not have to be executed by the user. This movement is executed by a spring which is prestressed by the rotary and sliding movement.

The force applied to the mating contact unit and/or to the contact means when the radio telephone is plugged on is introduced optimally into the holder since the contact means, which are configured, in particular, as connectors, are aligned perpendicularly to the axis of rotation of the mating contact unit.

Pressure on the contact means thus does not result in any torque about the axis of rotation, and the compressive force is absorbed by the holder without any yielding movement being possible.

With the aid of at least one spring element, the mating contact unit is always drawn in the direction of the accommodating/discharge position, with the result that the contact means is always located in the same position. The user is thus capable of coupling the radio telephone by a routine hand movement.

A braking element which acts at least in certain regions ensures that the radio telephone is moved carefully in damped manner from the operating position into the accommodating/discharge position. Said braking element brakes the sliding movement and/or the rotary movement of the mating contact unit.

The radio telephone is arrested in the operating position in the head region of the holder. A restraining element, which grips over the head region of the radio telephone, prevents the radio telephone from being pushed out of the operating position by the mating contact unit and/or the longitudinal slide. Also arranged in the accommodating region of the holder are level-compensating elements which push against the rear side of the radio telephone. By virtue of the interaction of the level-compensating elements and of the restraining element, the radio telephone we [sic] accommodated in the head region of the holder in a play-free manner irrespective of the housing thickness.

Furthermore, when the radio telephone is moved into the operating position, an ejector, which acts on the rear side and/or the head side of the radio telephone is prestressed. This ejector causes the radio telephone, when released by the restraining element, to be raised from the accommodating region of the holder by way of the head region. The radio telephone is thus prevented in an effective manner from being jammed in the mount by the spring force acting on the longitudinal slides and/or the contact-making unit.

Finally, it is advantageous for the contact means to be mounted in a floating manner, for example, in a plane located perpendicularly to the contact-making direction.

This measure ensures that a radio telephone positioned with the contact unit in a slightly skewed manner does not damage the mating contact unit.

Further details of the invention are described in the drawing with reference to schematically illustrated exemplary embodiments.

In the drawing:

FIG. 2 shows a plan view of the holder;

FIG. 3 shows a cross section through the holder along section line III-III illustrated in FIG. 2;

Figure 1:
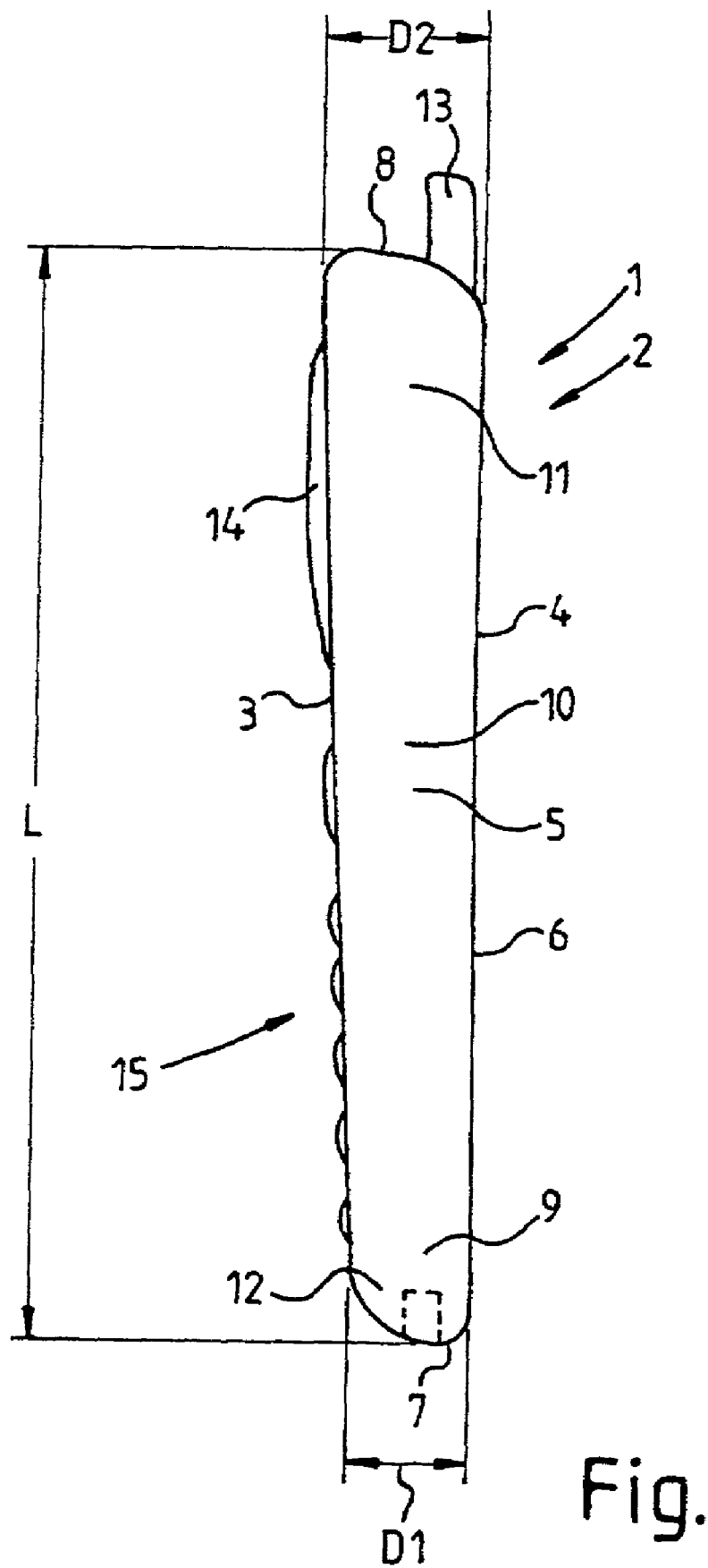
FIG. 1 shows a side view of a radio telephone.

FIG. 1 shows a radio telephone 1 with the housing 2. The housing 2 of the radio telephone 1 has a front side 3, a rear side 4, side surfaces 5, 6, a foot side 7 and a head side 8. The radio telephone 1 also has a foot region 9, a central region 10 and a head region 11. The foot region 9 is terminated by a contact unit 12. An aerial 13 and a display 14 are arranged in the head region 11. The foot region and the central region 9, 10 have a keypad 15 on the front side 3. The radio telephone 1 has a thickness D1 in the foot region 9, a thickness D2 in the head region 11, and a longitudinal dimension L.

FIG. 2 illustrates a holder 20. The latter has a mount 21 which extends beneath a cover 22 into a compartment 23. The mount 21 has a contour 24 (partially illustrated by dashed lines) which corresponds essentially to the outline of a radio telephone. A region 25 here is to be assigned to an aerial of a radio telephone. The holder 20 is subdivided roughly into a head region 26, a central region 27 and a foot region 28. A mating contact unit 29 is arranged in the central region 27, in which the mount 21 merges into the compartment 23. Said mating contact unit is made up essentially of contact means 30 and a roller-like basic body 31. The mating contact unit 29 is mounted such that it can be pivoted about an axis of rotation 32. Furthermore, the mating contact unit 29 can be displaced in an arrow direction x, along guides 33 (see FIG. 4), into the compartment 23. Arranged in the head region 26 of the holder 20 is a restraining element 34 which covers over the mount 21 by way of a section 35 (see also FIG. 4). In the transition from the head region 26 into the central region 27, level-compensating elements 36 are arranged in the mount 21.

FIG. 3 shows a section through the holder 20, illustrated in FIG. 2, along section line III-III. A guide 37 for an ejector 38 (illustrated in FIG. 4) is illustrated beneath the restraining element 34.

Figure 4:
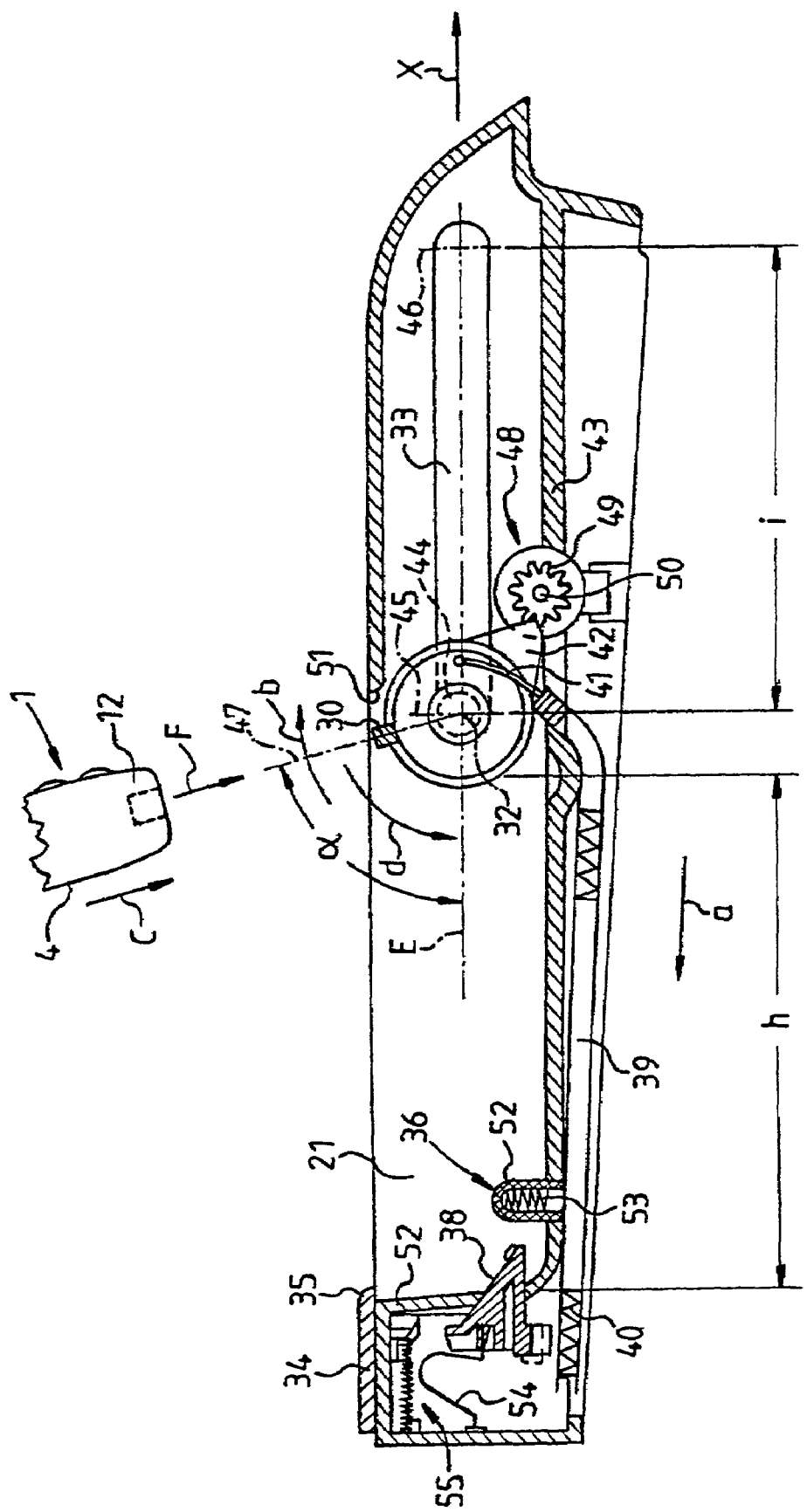
FIG. 4 shows a longitudinal section through the holder along section line IV-IV illustrated in FIG. 2.

FIG. 4 shows a longitudinal section through the holder 20, illustrated in FIG. 2, along section line IV-IV. Arranged beneath the mount 21 is a channel 39 in which there is a spring 40, certain sections of which are illustrated symbolically. In the central region 27 of the holder 20, the channel 39 opens out into the mount 21. The spring 40 is connected to the basic body 31 of the mating contact unit 29 via a flexible element 41. The mating contact unit 29 is rotated in an arrow direction b by the restoring force of the spring 40, said force acting in arrow direction a. The rotation of the mating contact unit 29 is limited by a cam 42 which is integrally formed on the basic body 31 and strikes against a wall 43 bounding the mount 21. The angle α through which the contact means 30 and/or the mating contact unit 29 can be rotated in relation to a main plane E of the holder 20 is thus fixed at approximately 75°. The mating contact unit 29 can be rotated about the axis of rotation 32 on a pin 44. The pin 44 can be displaced from a first position 45 into a second position 46 in arrow direction x, along the guides 33.

In FIG. 4, the mating contact unit 29 is located in an accommodating and/or discharge position 47 for the radio telephone 1. In this accommodating position 47, the radio telephone 1 is plugged on the mating contact unit 29 in arrow direction c. In this case, the radio telephone 1 is guided, and pushed onto, the contact means 30 by way of the contact unit 12. During the pushing-on operation, the radio telephone 1 acts on the mating contact unit 29 by a force F. The force F introduced is transmitted from said mating contact unit 29 to the holder 20 via the pin 44. The holder 20 is supported, in turn, on a bracket (not illustrated). Since the force F acts perpendicularly on the axis of rotation 32 no torque which causes the mating contact unit 29 to rotate about the axis of rotation 32 is produced. The mating contact unit 29 is prevented from sliding away in the guides 33 in that a brake 48 is designed such that first of all a rotary movement of the mating contact unit 29 has to take place. The brake 48 has a gearwheel 49, which can be rotated about a pin 50. The rotatability of the gearwheel 49 is made slightly more difficult. Arranged on the cam 42 of the mating contact unit 29 is a toothing formation (not illustrated) on which the gearwheel 49 rolls during rotation of the mating contact unit 29.

From the accommodating position 47, in which the radio telephone 1 is plugged on the mating contact unit 29, the mating contact unit 29, together with the radio telephone 1, is pivoted in arrow direction d. This rotary movement is followed by a rotary/sliding movement at the latest when the radio telephone 1 butts against the section 35 of the restraining element 34 by way of its rear side 4. It is also possible for this combined rotary/sliding movement to commence, at the earliest, when the rotary movement produces, between the front side 3 of the radio telephone 1 and an edge 51 of the cover 22, a spacing which allows displacement of the radio telephone 1 in arrow direction x. The extent to which a sliding movement in the direction of the arrow x is necessary depends on the longitudinal dimension L of the radio telephone 1. The holder 20 illustrated in FIG. 4 is suitable for accommodating a radio telephone 1 which has at least one length dimension L corresponding to a spacing h between the basic body 31 and a wall 52 of the mount 21. By virtue of the mating contact unit 29 being displaced in the guides 33 in the arrow direction x, it is possible to accommodate a radio telephone 1 with a length dimension L which is somewhat smaller than the sum of the spacings h and i. In this case, i is the extent of the maximum displacement path of the mating contact unit 29 in arrow direction x. The rotary/sliding movement of the radio telephone 1 and of the mating contact unit 29 is continued until the radio telephone 1 comes to rest approximately parallel to the main plane E. This is followed by a rearward sliding movement of the radio telephone 1 and of the mating contact unit 29 in arrow direction a. This rearward sliding movement is executed by the spring 40, which has been stressed by the rotary/sliding operation. By virtue of this rearward sliding movement, the radio telephone 1 grips behind the restraining element 34 by way of its head region 11 and has reached an operating position. In this operating position, the radio telephone 1 is accommodated to the full extent by the mount 21 and is retained in a play-free manner between the restraining element 34 and the level-compensating element 36. The level-compensating element 36 comprises an elastic cap 52 which accommodates a spring 53. The level-compensating element 36 compensates for radio telephones 1 of different thicknesses D2. Furthermore, the rearward sliding movement prestresses a leafspring 54 to which the ejector 38 is connected.

A movement of the radio telephone 1 from said operating position into the discharge position 47 can be initiated by the restraining element 34, which is prestressed in arrow direction x by the spring mechanism 55, being slid in the rearward direction. The ejector 38 and the prestress spring 40 cause the radio telephone 1 and the mating contact unit 29 to be rotated in arrow direction b. As soon as the head region 11 of the radio telephone 1 is located above the restraining element 34, this rotation is superimposed by a sliding movement in arrow direction a, as long as the mating contact unit 29 is not still located in position 45. During the final rotary movement of the radio telephone 1 and of the mating contact unit 29, the brake 48 is active and allows the discharge position 47 to be approached smoothly. In the discharge position 47, it is possible for the radio telephone 1 to be removed from the mating contact unit 29 or for the radio telephone 1 to be moved into the operating position again.

Figure 5:
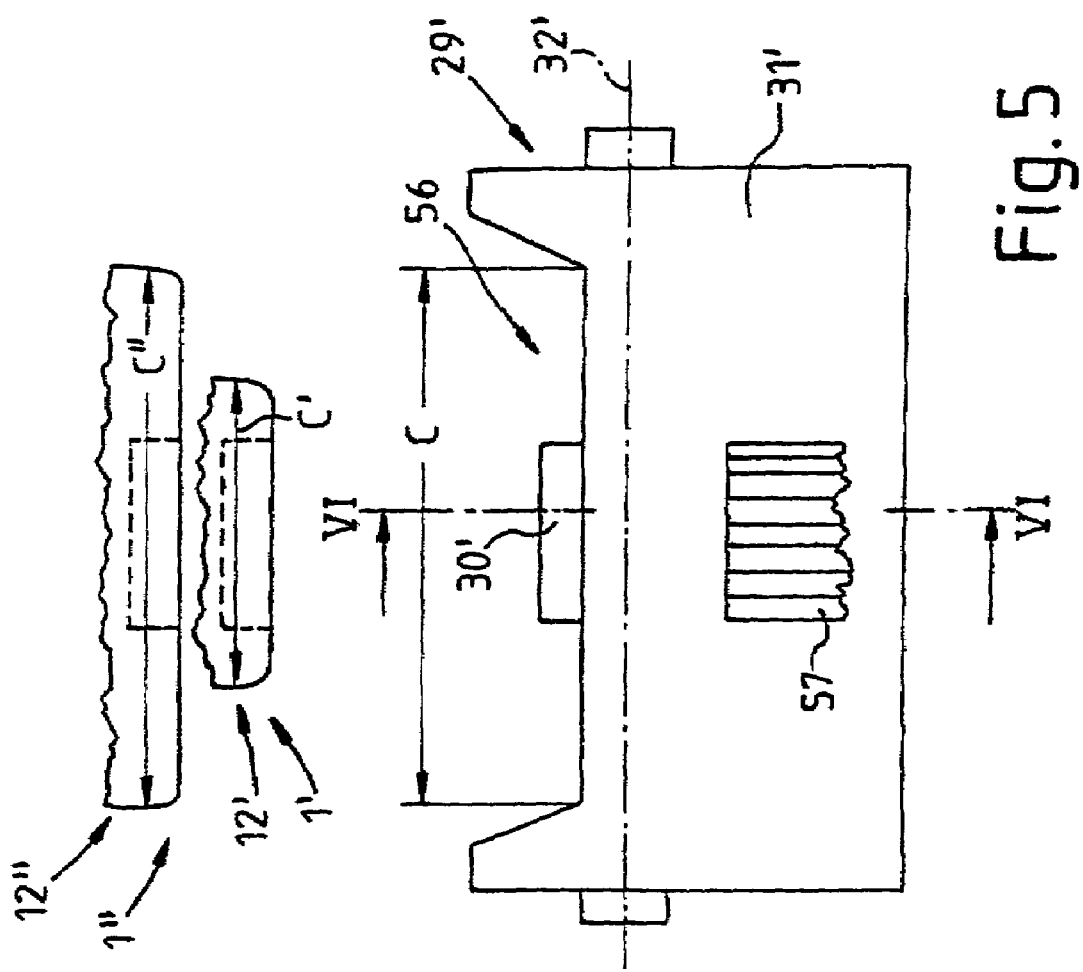
FIG. 5 shows a side view of an alternative mating contact unit with two contact units of two different radio telephones.

FIG. 5 shows a side view of an alternative mating contact unit 29'. Contact units 12', 12" of radio telephones 1', 1" are illustrated schematically above the mating contact unit 29'. The mating contact unit 29' has a basic body 31', which can be rotated about an axis of rotation 32'. The basic body 31' has a flattened portion 56 on which contact means 30' are arranged. The contact means 30' are connected, via a ribbon cable 57 running in part in the basic body 31', to components (not illustrated) such as, for example, a microphone, loudspeaker and aerial. A variant which is not illustrated also provides for connection via a coaxial cable. The flattened portion 56 has a width C which makes it possible for radio telephones 1', 1" of different widths C', C" to be positioned on the contact means 30', the contact units 12', 12" of the radio telephones 1', 1" gripping around, and accommodating, the contact means 30' of the mating contact unit 29'.

Figure 6:
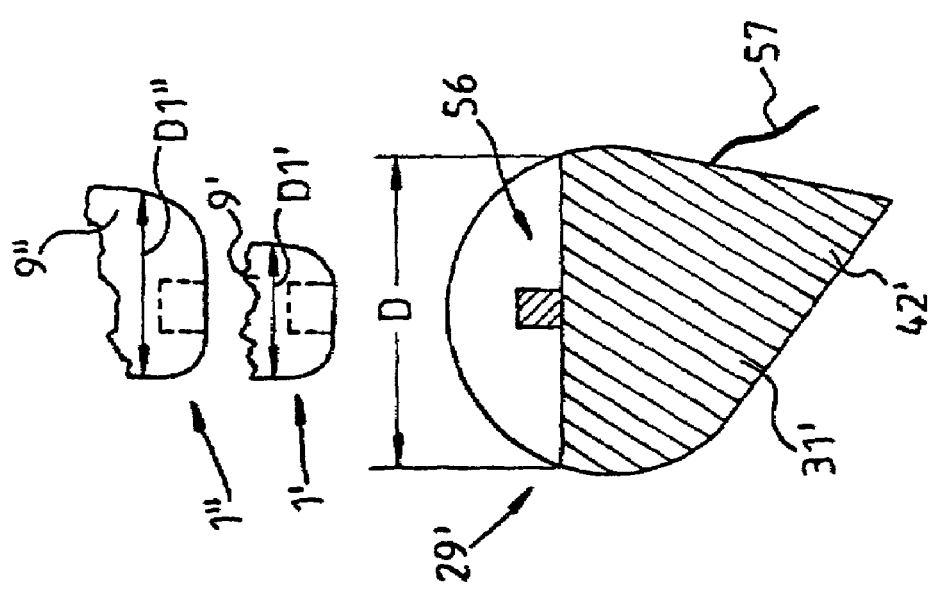
FIG. 6 shows a section through the alternative mating contact unit, illustrated in FIG. 5, along section line VI-VI and two contact units of two different radio telephones.

FIG. 6 shows a section through the mating contact unit 29' along the section line VI-VI illustrated in FIG. 5. The section clearly shows that the mating contact unit 29' has a cam 42', which serves for limiting the rotation of the mating contact unit 29' (see description in relation to FIG. 4). The flattened portion 56 of the mating contact unit 29' has a thickness D which allows contact to be made with radio telephones 1', 1" with foot regions 9', 9" of different thicknesses D1', D1".

The invention, rather than being restricted to exemplary embodiments illustrated or described, also covers developments of the invention within the scope of the claims. The invention also makes provision, in particular, for connections between the contact unit of the radio telephone and the mating contact unit which are purely mechanical, provision being made here for form-fitting and/or force-fitting connections in particular. A force-fitting connection may be realized, for example, by magnets.

LIST OF DESIGNATIONS 1, 1', 1" Radio telephone
2 Housing
3 Front side
4 Rear side
5, 6 Side surface
7 Foot side
8 Head side
9, 9', 9" Foot region
10 Central region
11 Head region
12, 12', 12" Contact unit
13 Aerial
14 Display
15 Keypad
20 Holder
21 Mount
22 Cover
23 Compartment
24 Contour
25 Region
26 Head region
27 Central region
28 Foot region
29, 29' Mating contact unit
30, 30' Contact means
31, 31' Basic body
32, 32' Axis of rotation
33 Guide
34 Restoring element
35 Section
36 Level-compensating element
37 Guide
38 Ejector
39 Channel
40 Spring
41 Element
42, 42' Cam
43 Wall
44 Pin
45 Position
46 Position
47 Accommodating/discharge position
48 Brake
49 Gearwheel
50 Pin
51 Edge
52 Cap
53 Spring
54 Leafspring
55 Spring mechanism
56 Flattened portion
57 Ribbon cable

The invention claimed is:

1. An apparatus for securing a telephone having a housing and a contact mechanism, the housing being elongate with a width, thickness, and length, the apparatus comprising:
    a holder for the telephone; and
    a mating contact unit for engaging the contact mechanism of the telephone, said mating contact unit being pivotable through a pivot angle and longitudinally displaceable in the holder such that the holder accommodates and secures at least part of the housing of the telephone in an operating position, wherein said mating contact unit comprises a body and means for establishing a connection with the telephone arranged on the body perpendicular to an axis of rotation of the body.

2. The apparatus of claim 1, wherein said mating contact unit includes a longitudinal slide mounted within the holder.

3. The apparatus of claim 1, wherein said holder is adapted to accommodate at least one of different telephone housing widths and different telephone housing thicknesses.

4. The apparatus of claim 1, wherein said mating contact unit is pivotable into a first position approximately 45° to 135° relative to a plane parallel to the holder, the first position being an accommodating/discharge position.

5. The apparatus of claim 4, wherein said mating contact unit is adapted to be moved from the first position into the operating position by
   a) a pivoting movement,
   b) at least one of subsequent pivoting movement and a subsequent sliding movement, and
   c) a rearward sliding movement.

6. The apparatus of claim 4, further comprising a spring mechanism arranged at least partially in said holder for urging the mating contact unit in the first position by counteracting at least one of a rotary and a sliding movement of the mating contact unit.

7. The apparatus of claim 6, further comprising a restraining element for engaging an end of the housing opposite the contact mechanism when the mating contact unit is in the operating position.

8. The apparatus of claim 1, further comprising a brake for at least partially damping movement of said mating contact unit.

9. The apparatus of claim 1, further comprising at least one level compensating element arranged on the holder for engagement with a rear side of the telephone when telephone is engaged with said mating contact unit in the operating position.

10. The apparatus of claim 1, further comprising an ejector mechanism arranged on said holder, said ejector mechanism being maintained in a prestressed position by the telephone when the telephone is engaged with said mating contact unit in the operating position.

11. The apparatus of claim 1, wherein said mating contact unit has a flattened portion and means for establishing a connection with the telephone floatingly mounted on the mating contact unit relative a plane parallel to the flattened portion.

12. An apparatus for securing a telephone, the telephone having a housing and a contact mechanism, the apparatus comprising:
   a holder for the telephone; and
   a mating contact unit for engaging the contact mechanism of the telephone, said mating contact unit being pivotable from a first position through a pivot angle and longitudinally displaceable in the holder such that the holder accommodates and secures at least part of the housing of the telephone in an operating position, wherein said mating contact unit is adapted to be moved from the first position into the operating position by
   a) a pivoting movement,
   b) at least one of a subsequent pivoting movement and a subsequent sliding movement, and
   c) a rearward sliding movement.

13. An apparatus for securing a telephone, the telephone having a housing and a contact unit, the apparatus comprising:
   a holder arranged to receive the telephone; and
   a mating contact unit pivotably and slidably disposed on the holder and comprising:
      a body; and
      a contact means arranged on the body perpendicular to an axis of rotation of the body and adapted to engage the contact unit of the telephone, wherein the mating contact unit is pivotable through a pivot angle from a first discharge position and subsequently longitudinally displaceable into a second secured position.

* * * * *